United States Patent
Selvaraj et al.

(10) Patent No.: US 10,374,942 B2
(45) Date of Patent: Aug. 6, 2019

(54) LINK AGGREGATION GROUP MANAGEMENT

(71) Applicant: LENOVO Enterprise Solutions (Singapore) PTE. LTD., New Tech Park (SG)

(72) Inventors: Venkatesan Selvaraj, Sunnyvale, CA (US); Aksh Mittal, San Jose, CA (US)

(73) Assignee: LENOVO ENTERPRISE SOLUTIONS (SINGAPORE) PTE. LTD, Singapore (SG)

(*) Notice: Subject to any disclaimer, the term of this patent is extended or adjusted under 35 U.S.C. 154(b) by 0 days.

(21) Appl. No.: 15/697,273

(22) Filed: Sep. 6, 2017

(65) Prior Publication Data

US 2019/0075043 A1    Mar. 7, 2019

(51) Int. Cl.
| | |
|---|---|
| *H04L 12/709* | (2013.01) |
| *H04L 12/911* | (2013.01) |
| *H04L 12/891* | (2013.01) |
| H04L 12/803 | (2013.01) |
| H04L 12/24 | (2006.01) |

(52) U.S. Cl.
CPC ............ *H04L 45/245* (2013.01); *H04L 47/41* (2013.01); *H04L 47/828* (2013.01); *H04L 41/12* (2013.01); *H04L 47/125* (2013.01)

(58) Field of Classification Search
CPC combination set(s) only.
See application file for complete search history.

(56) References Cited

U.S. PATENT DOCUMENTS

| | | | |
|---|---|---|---|
| 9,001,825 B2 | 4/2015 | Sait et al. | |
| 2013/0194914 A1* | 8/2013 | Agarwal | H04L 45/245 370/225 |
| 2015/0026344 A1* | 1/2015 | Ravinoothala | H04L 47/125 709/226 |
| 2017/0310548 A1* | 10/2017 | Jailani | H04L 41/0886 |
| 2018/0198888 A1* | 7/2018 | King | H04L 67/34 |

* cited by examiner

*Primary Examiner* — Lakeram Jangbahadur
(74) *Attorney, Agent, or Firm* — Kunzler Bean & Adamson; Bruce R. Needham

(57) ABSTRACT

An apparatus, a method, a system, and computer program product are disclosed for link aggregation group management. A method includes receiving an identifier from a device connected to a first port of a first switch, determining whether a second switch has a connection to the device on a first port of the second switch based on the identifier for the device, and autonomously configuring a link aggregation group comprising the first port of the first switch and the first port of the second switch in response to determining that the device is connected to the first port of the first switch and the first port of the second switch.

16 Claims, 5 Drawing Sheets

LINK AGGREGATION GROUP MANAGEMENT

FIELD

The subject matter disclosed herein relates to network management and more particularly relates to autonomously managing link aggregation groups in a network with switch-level redundancy.

BACKGROUND

Networks may include redundant paths for traffic flow through from a host device the network via multiple switches, routers, or other network devices. In certain network configurations with redundancy, multiple links may be grouped together to form a link aggregation group. Forming a link aggregation group, however, may require a user to manually configure the link aggregation group.

BRIEF SUMMARY

An apparatus for link aggregation group management is disclosed. A method and computer program product also perform the functions of the apparatus. One embodiment of an apparatus includes a device module that receives an identifier from a device connected to a first port of a first switch. The apparatus includes a connection module that determines whether a second switch has a connection to the device on a first port of the second switch based on the identifier for the device. The apparatus includes a group module that autonomously configures a link aggregation group that includes the first port of the first switch and the first port of the second switch in response to determining that the device is connected to the first port of the first switch and the first port of the second switch. In various embodiments, at least a portion of the modules include hardware circuits, programmable hardware devices and/or a processor that executes code.

One embodiment of a method includes receiving an identifier from a device connected to a first port of a first switch. The method includes determining whether a second switch has a connection to the device on a first port of the second switch based on the identifier for the device. The method includes autonomously configuring a link aggregation group that includes the first port of the first switch and the first port of the second switch in response to determining that the device is connected to the first port of the first switch and the first port of the second switch.

One embodiment of a program product includes a computer readable storage medium that stores code executable by a processor. The executable code includes code to perform receiving an identifier from a device connected to a first port of a first switch. The executable code includes code to perform determining whether a second switch has a connection to the device on a first port of the second switch based on the identifier for the device. The executable code includes code to perform autonomously configuring a link aggregation group that includes the first port of the first switch and the first port of the second switch in response to determining that the device is connected to the first port of the first switch and the first port of the second switch.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
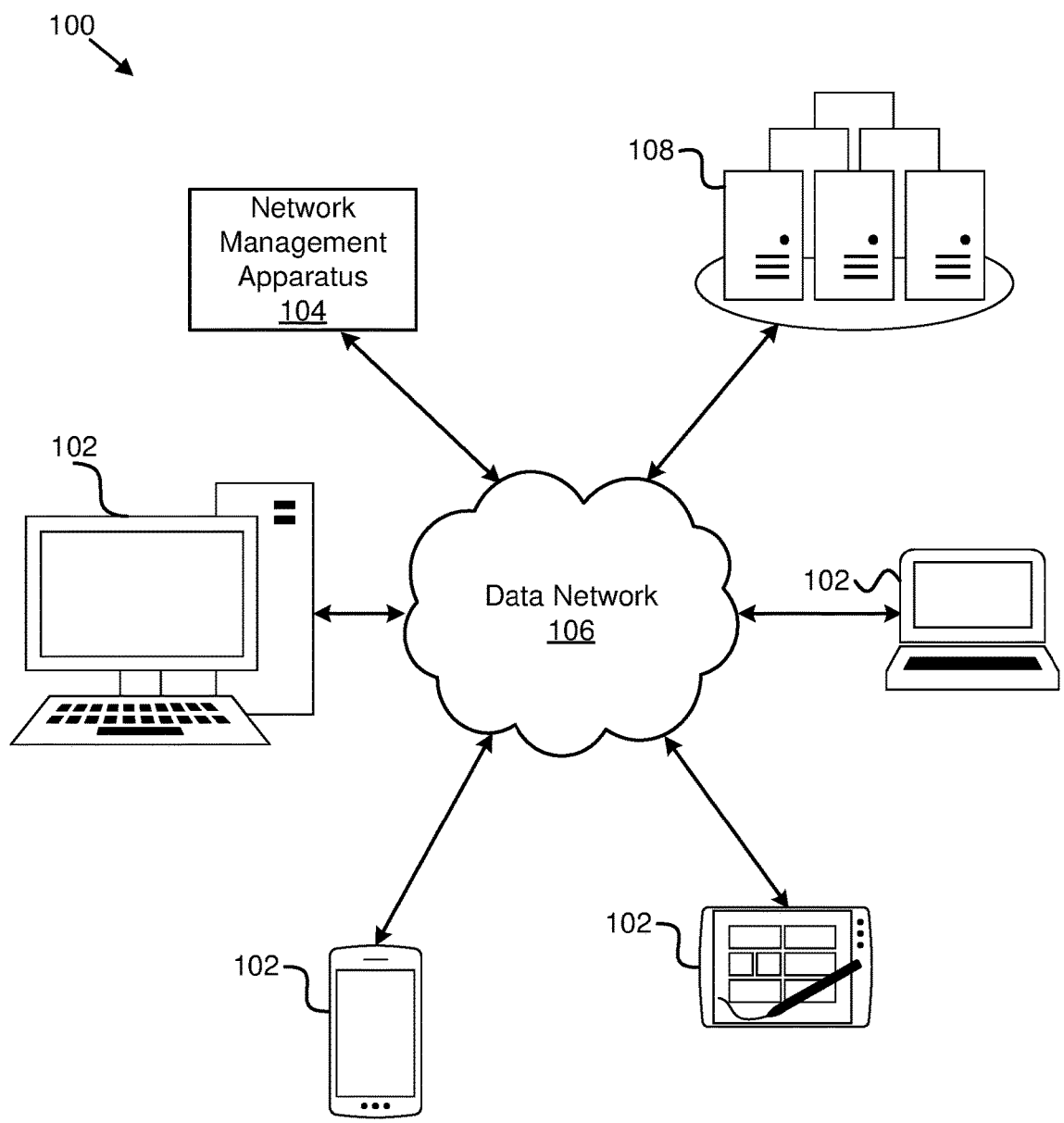
FIG. 1 is a schematic block diagram illustrating one embodiment of a system for link aggregation group management.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for link aggregation group management is disclosed. A method and computer program product also perform the functions of the apparatus. One embodiment of an apparatus includes a device module that receives an identifier from a device connected to a first port of a first switch. The apparatus includes a connection module that determines whether a second switch has a connection to the device on a first port of the second switch based on the identifier for the device. The apparatus includes a group module that autonomously configures a link aggregation group that includes the first port of the first switch and the first port of the second switch in response to determining that the device is connected to the first port of the first switch and the first port of the second switch. In various embodiments, at least a portion of the modules include hardware circuits, programmable hardware devices and/or a processor that executes code.

In further embodiments, the device module detects that the connection to the device is changed to a second port of the first switch, the connection module sends a port identifier for the second port to the second switch in response to detecting that the connection to the device is changed to the second port of the first switch, and the group module autonomously updates the link aggregation group such that the link aggregation group includes the second port of the first switch and the first port of the second switch.

In some embodiments, the connection module checks the second switch at periodic intervals to determine whether the device is connected to a second port of the second switch instead of the first port of the second switch, and the group module autonomously updates the link aggregation group such that the link aggregation group includes the first port of the first switch and the second port of the second switch in response to determining that the device is connected to the second port of the second switch.

In one embodiment, the apparatus includes an error module that detects that the connection to the device is down on the first port of the first switch, provides a notification that the connection to the device is down on the first port of the first switch, and autonomously removes the first port of the first switch from the link aggregation group. The group module, in various embodiments, maintains a mapping of ports of the first switch to link aggregation groups comprising the ports of the first switch and corresponding ports of the second switch. In some embodiments, the group module autonomously configures the link aggregation group free of input from a user.

In one embodiment, the device module, the connection module, and the group module are located on one or more of the first switch and the second switch. In certain embodiments, the first switch and the second switch are communicatively coupled to each other via an inter-switch link, which includes a plurality of network connections. In further embodiments, the identifier for the device connected to the first switch and the second switch is a hostname for the device.

In one embodiment, the first switch and the second switch have link layer discovery protocol ("LLDP") enabled and/or the device connected to the first switch and the second switch has link layer discovery protocol ("LLDP") enabled. In various embodiments, the link aggregation group includes one of a virtual link aggregation group, a multichassis link aggregation group, an etherchannel, and a virtual port channel.

One embodiment of a method includes receiving an identifier from a device connected to a first port of a first switch. The method includes determining whether a second switch has a connection to the device on a first port of the second switch based on the identifier for the device. The method includes autonomously configuring a link aggregation group that includes the first port of the first switch and the first port of the second switch in response to determining that the device is connected to the first port of the first switch and the first port of the second switch.

In one embodiment, the method includes detecting that the connection to the device is changed to a second port of the first switch, sending a port identifier for the second port to the second switch in response to detecting that the connection to the device is changed to the second port of the first switch, and autonomously updating the link aggregation group such that the link aggregation group includes the second port of the first switch and the first port of the second switch.

In one embodiment, the method includes checking the second switch at periodic intervals to determine whether the device is connected to a second port of the second switch instead of the first port of the second switch, and autonomously updating the link aggregation group such that the link aggregation group includes the first port of the first switch and the second port of the second switch in response to determining that the device is connected to the second port of the second switch.

In further embodiments, the method includes detecting that the connection to the device is down on the first port of the first switch, providing a notification that the connection to the device is down on the first port of the first switch, and autonomously removing the first port of the first switch from the link aggregation group. In certain embodiments, the method includes maintaining a mapping of ports of the first switch to link aggregation groups comprising the ports of the first switch and corresponding ports of the second switch.

In some embodiments, the method includes autonomously configuring the link aggregation group free of input from a user. In one embodiment, the receiving, the determining, and the autonomously configuring are performed at one or more of the first switch and the second switch. In certain embodiments, the identifier for the device connected to the first switch and the second switch is a hostname for the device.

One embodiment of a program product includes a computer readable storage medium that stores code executable by a processor. The executable code includes code to perform receiving an identifier from a device connected to a first port of a first switch. The executable code includes code to perform determining whether a second switch has a connection to the device on a first port of the second switch based on the identifier for the device. The executable code includes code to perform autonomously configuring a link aggregation group that includes the first port of the first switch and the first port of the second switch in response to determining that the device is connected to the first port of the first switch and the first port of the second switch.

FIG. 1 is a schematic block diagram illustrating one embodiment of a system 100 for link aggregation group management. In one embodiment, the system 100 includes one or more information handling devices 102, one or more network management apparatuses 104, one or more data networks 106, and one or more servers 108. In certain embodiments, even though a specific number of information handling devices 102, network management apparatuses 104, data networks 106, and servers 108 are depicted in FIG. 1, one of skill in the art will recognize, in light of this disclosure, that any number of information handling devices 102, network management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like.

In one embodiment, the network management apparatus 104 is configured to receive an identifier from a device connected to a first port of a first switch, determine whether a second switch has a connection to the device on a first port of the second switch based on the identifier for the device, and autonomously configure a link aggregation group comprising the first port of the first switch and the first port of the second switch in response to determining that the device is connected to the first port of the first switch and the first port of the second switch. The network management apparatus 104, including its various sub-modules, may be located on one or more information handling devices 102 in the system 100, one or more servers 108, one or more network devices, and/or the like. The network management apparatus 104 is described in more detail below with reference to FIGS. 2 and 3.

In one embodiment, the network management apparatus 104 solves the technical problem of autonomously or dynamically configuring link aggregation groups within a network without requiring input from a user. The network management apparatus 104 actively monitors connections to devices at switch or router ports, and communicates with other switches or routers that are part of a switch redundancy group to determine whether other switches have connections to the same devices. If so, information is shared between the switches or routers autonomously, without user input or configuration, to configure a link aggregation group. In this manner, the network management apparatus 104 can dynamically and/or automatically create, monitor, manage, and re-configure link aggregation groups free from input from a user.

In various embodiments, the network management apparatus 104 may be embodied as a hardware appliance that can be installed or deployed on an information handling device 102, on a server 108, or elsewhere on the data network 106. In certain embodiments, the network management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the network management apparatus 104 may include a power interface, a wired and/or wireless network interface, a graphical interface that attaches to a display, and/or a semiconductor integrated circuit device as described below, configured to perform the functions described herein with regard to the network management apparatus 104.

The network management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the network management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the network management apparatus 104.

The semiconductor integrated circuit device or other hardware appliance of the network management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the network management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, bridges, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 or servers 108 via one or more switches, routers, bridges, and/or other networking equipment.

Figure 2:
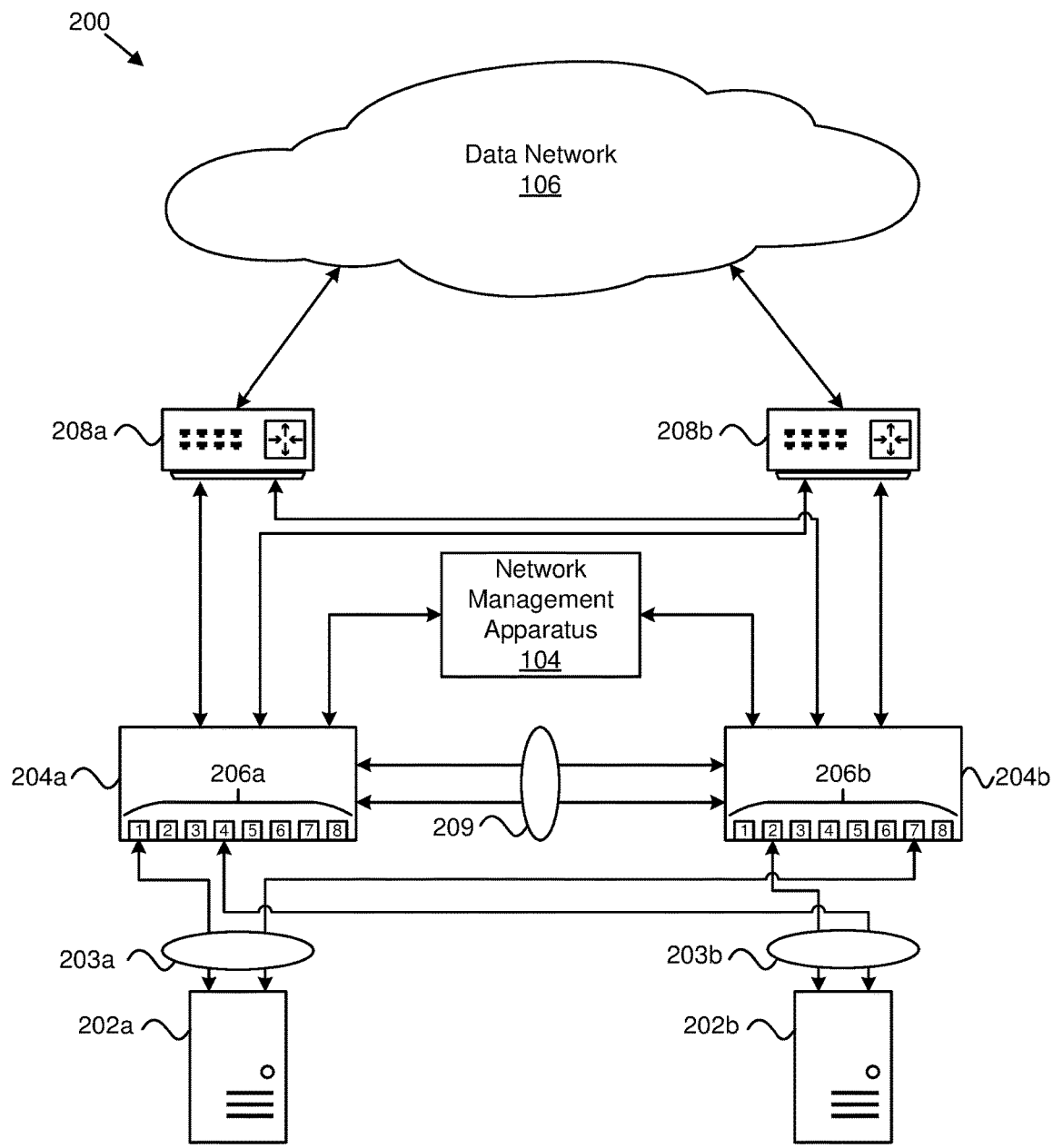
FIG. 2 is a schematic block diagram illustrating one embodiment of another system for link aggregation group management.

FIG. 2 depicts one embodiments of another system 200 for link aggregation group management. In one embodiment, the system 200 includes one or more servers 202a-b (collectively 202), multiple switches 204a-b (collectively 204), one or more routers 208a-b (collectively 208), which comprise a part of, or are otherwise connected to, the data network 106, and one or more network management apparatuses 104.

In one embodiment, the servers 202 are substantially similar to the servers 108 described above with reference to FIG. 1. For redundancy, each server 202 may have multiple connections to different switches 204 so that if a switch 204a fails, network traffic may continue to be transmitted through the other switches 204b that are still operational. For instance, a first server 202a may have a connection to a port 206a on a first switch 204a, and a connection to a port 206b on a second switch 204b. Similarly, a second server 202b may have a connection to a port 206a on a first switch 204a, and a connection to a port 206b on a second switch 204b. Thus, if the first switch 204a fails, network traffic may still be transmitted from a server 202 through the second switch 204b.

In such an embodiment, the connections coming from the servers 202, e.g., the server ports that are used to connect to the servers 202, are "teamed" (a.k.a., network interface card ("NIC") teaming, bonding, load balancing and failover ("LBFO"), aggregation, or the like) in an active-active mode. In other words, multiple network adaptors (or multiple ports of the network adapters) on each server 202 may be combined (logically) together to improve performance and provide redundancy in the event that a port or network adaptor malfunctions or otherwise becomes unavailable.

For example, if a server 202a has three network cards in one NIC team 203a, the operating system, an application, or a network controller may determine which of the three network cards in the NIC team 203a to use to send network traffic. If each of the network cards in the NIC team 203a are in "active" mode, then each of the network cards in the NIC team 203a may be used to send the network traffic. If a network card in the NIC team 203a is in "standby" mode, then that network card may be used to send network traffic when the network cards that are in "active" mode are not available. In this manner, if a NIC fails, then the other NICs in the NIC team 203a may be used to continue to send and receive network traffic.

In one embodiment, the servers 202 have unique identifiers that are used to uniquely identifier each server 202. The unique identifiers may include a host name, a media access control ("MAC") address, an internet protocol ("IP") address, and/or the like. In some embodiments, the servers 202 have link layer discovery protocol ("LLDP") enabled. As is known in the art, LLDP is a protocol used by network devices to broadcast or advertise their identities and other information such as capabilities, neighboring devices, and/or the like. Accordingly, the servers 202 may use LLDP to broadcast their identifiers to other devices, such as the switches 204.

In one embodiment, the switches 204 are connected to the servers 202 via a network connection, such as a wired connection, e.g., Ethernet, or a wireless connection. The switches 204a-b are configured to receive, process, and forward data to destination devices specified in the network packets. In some embodiments, each switch 204 includes one or more ports 206a-b (collectively 206) that serve as interfaces between the servers 202 and the switches 204. For example, a first server 202a may be connected to port 1 on a first switch 204a and port 7 on a second switch 204b, while a second server 202b may be connected to port 4 of a first switch 204a and port 2 of a second switch 204b. The switches 204 may be configured as layer 2 or layer 3 switches 204 of the Open Systems Interconnection ("OSI") model. In some embodiments, the switches 204 have LLDP enabled in order to discover network devices, such as the servers 202, and communicate with the network devices to share information, such as device identifiers.

In various embodiments, the switches 204 are communicatively connected to each other over an inter-switch link 209, which may include a plurality of different network connections that are used to communicate networking information, port information, connection information, and/or the like directly between the switches 204. In certain embodiments, the switches 204 communicate information related to creating, managing, maintaining, or the like, link aggregation groups. As used herein, a link aggregation group is a group of network connections that are combined in parallel in order to increase throughput, bandwidth, and redundancy. For example, a link aggregation group may include multiple physical connections connected to both switches 204 that are logically combined to act as a single logical interface. In such an embodiment, the link aggregation group may include a virtual link aggregation group (e.g., a combination of multiple physical connections that act as a single logical interface), a multi-chassis link aggregation group (e.g., a link aggregation group with constituent ports 206 that terminate on separate chassis), an EtherChannel by Cisco®, and a virtual port channel ("vPC"). In some embodiments, the switches 204 communicate to share link aggregation information using the link aggregation control protocol ("LACP").

In one embodiment, the routers 208 are configured to forward network traffic from the switches 204 to destinations downstream on the data network 106. For redundancy, each switch 204 may have connections to multiple different routers 208 so that network traffic can continue to flow through the data network 106 in the event that a router 208 fails.

In one embodiment, the network management apparatus 104, including the modules 302-308 of the network management apparatus that are described below, may be located, wholly or in part, on each of the switches 204, servers 202, or on a separate network device that is communicatively coupled to the switches 204 and/or the servers 202. The network management module 104 may be configured to receive an identifier from a server 202 at each of the switches 204, determine the ports 206 that the server 202 is connected to, communicate with the other switch 204 over the inter-switch link 209 to determine whether that switch 204 also has a connected to a server 202 with the received identifier, and if so, dynamically or autonomously creates a link aggregation group using the port information from each switch 204 that corresponds to the connection to the server 202. In this manner, the network management apparatus 104 autonomously creates link aggregation groups of the redundant server 202 connections to the switches 204 without requiring user input to setup, configure, and monitor the link aggregation group.

Figure 3:
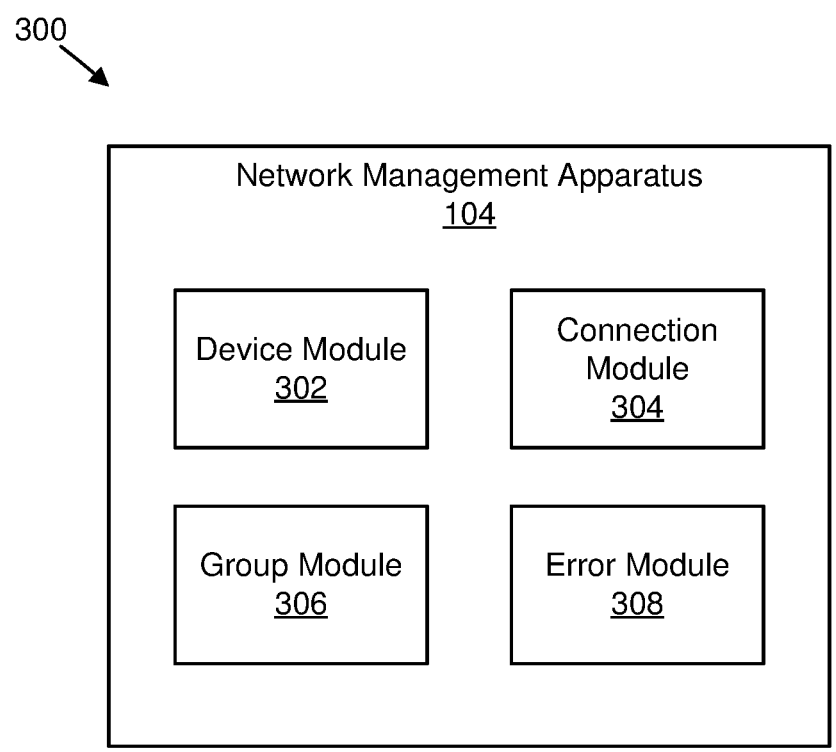
FIG. 3 is a schematic block diagram illustrating one embodiment of an apparatus for link aggregation group management.

FIG. 3 depicts one embodiment of an apparatus 300. The apparatus 300 includes an embodiment of a network management apparatus 104. The network management apparatus 104 includes a device module 302, a connection module 304, a group module 306, and an error module 308, which are described in more detail below.

In one embodiment, the device module 302 is configured to receive an identifier from a device connected to a first port 206a of a first switch 204a. As described above, the identifier may be a unique identifier for a device such as a host name, a MAC address, an IP address, and/or the like. The device module 302, in certain embodiments, detects when a device is connected to a port 206 on a switch 204, and receives or requests the unique identifier from the device over the connection to the device in response to detecting that the device is connected to the switches 204. In some embodiments, the device module 302 polls the ports 206 of a switch 204 at certain intervals to determine whether there are new or changed connections to a switch 204. In some embodiments, the device module 302 uses LLDP to discover devices and receive device identifiers from the devices.

The connection module 304, in one embodiment, determines whether a second switch 204b has a connection to the device on a first port 206b of the second switch 204b. The connection module 304, for instance, may use the inter-switch link 209 between the switches 204 to communicate the identifier information received from the connected device to determine whether the second switch 204b also has a connection on a port 206b to a device with the same identifier. In some embodiments, the connection module 304 continuously polls the second switch 204b to determine if the second switch 204b has a connection to the device in response to detecting the connection to the device on the first switch 204a. The connection module 304 may poll the second switch 204b until a threshold amount of time is satisfied, e.g., until a timer expires.

In one embodiment, if the connection module 304 receives confirmation from the second switch 204b that a device with the same identifier is connected to the second switch 204b, the connection module 304 may then receive port 206 information associated with the port 206b that the device is connected to on the second switch 204b. The port information may include a port identifier that uniquely identifies the port 206b that the device is connected to.

In one embodiment, the group module 306 autonomously and dynamically without user input configures a link aggregation group on the first switch 204a and/or the second switch 204b that includes the port information of the first port 206a of the first switch 204a that the device is connected to and the first port 206b of the second switch 204b that the device is simultaneously connected to. The group module 306 may maintain a database, a list, a map, and/or the like of the ports 206 on the first and second switches 204 that include port information for a particular link aggregation group associated with a device that is connected to ports 206 on both the first and second switches 204. For instance, the group module 306 may maintain a map of ports 206 to the devices and the link aggregation groups that they belong to or are associated with.

In this manner, the network management module 104 can dynamically configure link aggregation groups without requiring a user to manually configure the link aggregation groups by detecting when devices are connected to a switch, receiving device information for the device, determining the ports of other switches that the device is connected to, and grouping the ports, e.g., the connections, together to form a link aggregation group.

In certain embodiments, the device module 302 actively monitors the existing connections that a switch 204 has to one or more devices. For example, the device module 302 may periodically check the connections to see if a device is still connected to a switch 204, is connected to the same or a different port 206 of the switch 204, and/or the like. In some embodiments, the device module 302 receives notifications, messages, signals, and/or the like when a new connection to the switch 204 is made, or when an existing connection to a device is changed, is unavailable, and/or the like.

Thus, in one embodiment, the device module 302 detects that an existing connection to a device is changed to a second port 206a of the first switch 204a that is different than the port 206a of the first switch 204a that the device was previously connected to. Changing ports 206 that devices are connected to may necessitate updating the link aggregation information on the switches 204. Accordingly, the connection module 304, in some embodiments, sends the port information for the second port 206a of the first switch 204a, e.g., the port 206a that the existing connection was changed to, to the second switch 204b. In response to receiving the new port information on the first and second switches 204, the group module 306 autonomously updates the link aggregation group information for the device on both the first and second switches 204.

In some embodiments, the connection module 304 periodically checks a second switch 204b from the first switch 204a to determine whether a device that has connections to both switches 204 as part of a link aggregation group is connected to a different port 206 on the second switch 204b than a port 206 that the device was previously connected to. If so, the connection module 304 receives the port information for the new port 206 that the device is connected to from the second switch 204b and the group module 306 autonomously updates the link aggregation group information for the device on the first switch 204a.

In certain embodiments, the error module 308 detects that an existing connection to a device on a first port 206 of a first switch 204a is down, unavailable, unresponsive, and/or the like. For instance, the error module 308 may periodically check the active ports 206 on a switch 204 that include link aggregation groups to determine whether a connection to a port 206 of a link aggregation group is down. The error module 308, for example, may attempt to ping or otherwise send a message to a device that is connected to a switch 204 at a certain port 206. If no response is received from the device, the error module 308 may determine that the connection and/or the device is down.

In other embodiments, the error module 308 may receive or detect a signal, a notification, a message, and/or the like, in response to a connection to the switch 204, or a port 306 of a switch 204, being physically disconnected, being turned-off, disabled, or inactivated, and/or the like.

If the error module 308 determines that a connection to the switch 204 is down, or that a port 206 of the switch 204 has been deactivated, disabled, or the like, the error module 308 provides a notification of the down connection, and dynamically or autonomously removes the port associated with the down connection from the link aggregation group. For example, the error module 308 may send the notification to switches 204 that have connections to the device on ports 206 that include part of the link aggregation group so that the switches 204 can dynamically update the link aggregation group information by removing the port information associated with the down connection from the link aggregation group.

In one embodiment, the error module 308 determines whether connections from a device are connection to ports 206 that have been pre-assigned to certain link aggregation groups. For instance, port 1 on a first switch 204a and port 7 on a second switch 204b may be pre-assigned to be part of a link aggregation group for a particular device. The error module 308 may detect when a connection to the device on a pre-assigned port 206 is down, disconnected, or otherwise inactive, and provide a notification/message to a user, network administrator, other network devices, and/or the like. In certain embodiments, however, the error module 308 may dynamically update the port assignments for the link aggregation group based on determining that the connection to the device has been connected to a new port 206.

Figure 4:
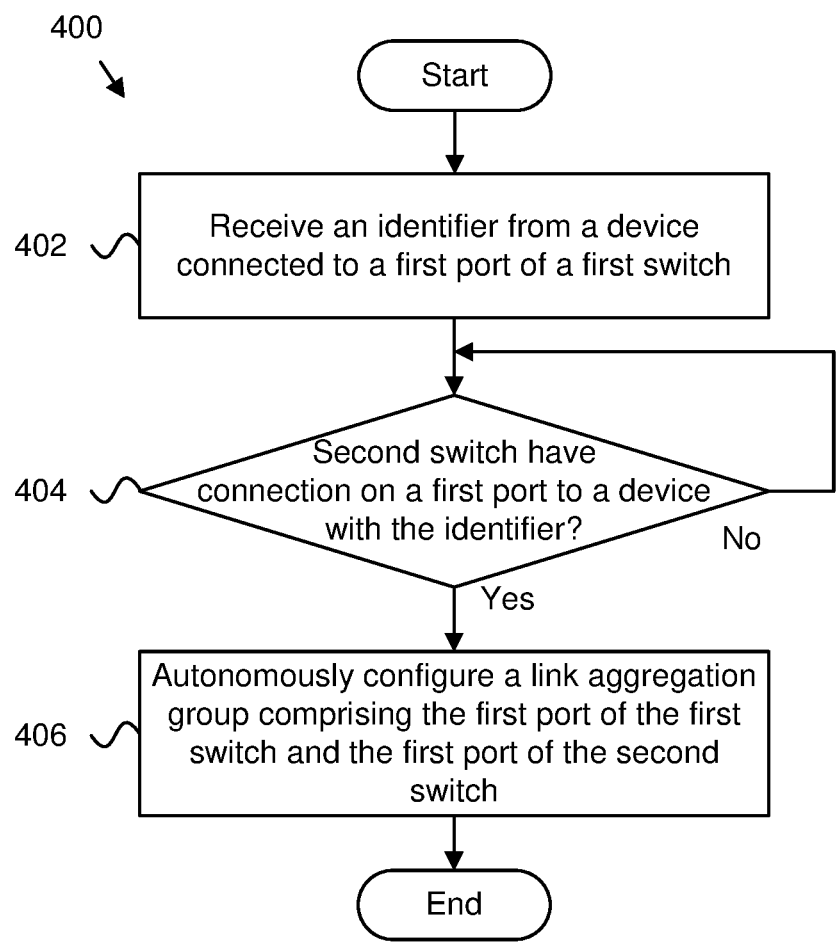
FIG. 4 is a schematic flow chart diagram illustrating one embodiment of a method for link aggregation group management.

FIG. 4 depicts one embodiment of a method 400 for link aggregation group management. In one embodiment, the method 400 begins and receives 402 an identifier, e.g., a hostname, from a device that is connected to a first port 206a of a first switch 204a. In a further embodiment, the method 400 determines 404 whether a second switch 204b has a connection to the device on a first port 206b of the second switch 204b based on the identifier that was received 402 at the first switch 204a. If not, the method 400 continues to determine whether the second switch 204b has a connection to the device based on the device identifier. Otherwise, the method 400 dynamically and autonomously configures 406 a link aggregation group that includes the first port 206a of the first switch 204a and the second port 206b of the second switch 204b, and the method 400 ends. In certain embodiments, the device module 302, the connection module 304, and the group module 306 perform the various steps of the method 400.

Figure 5:
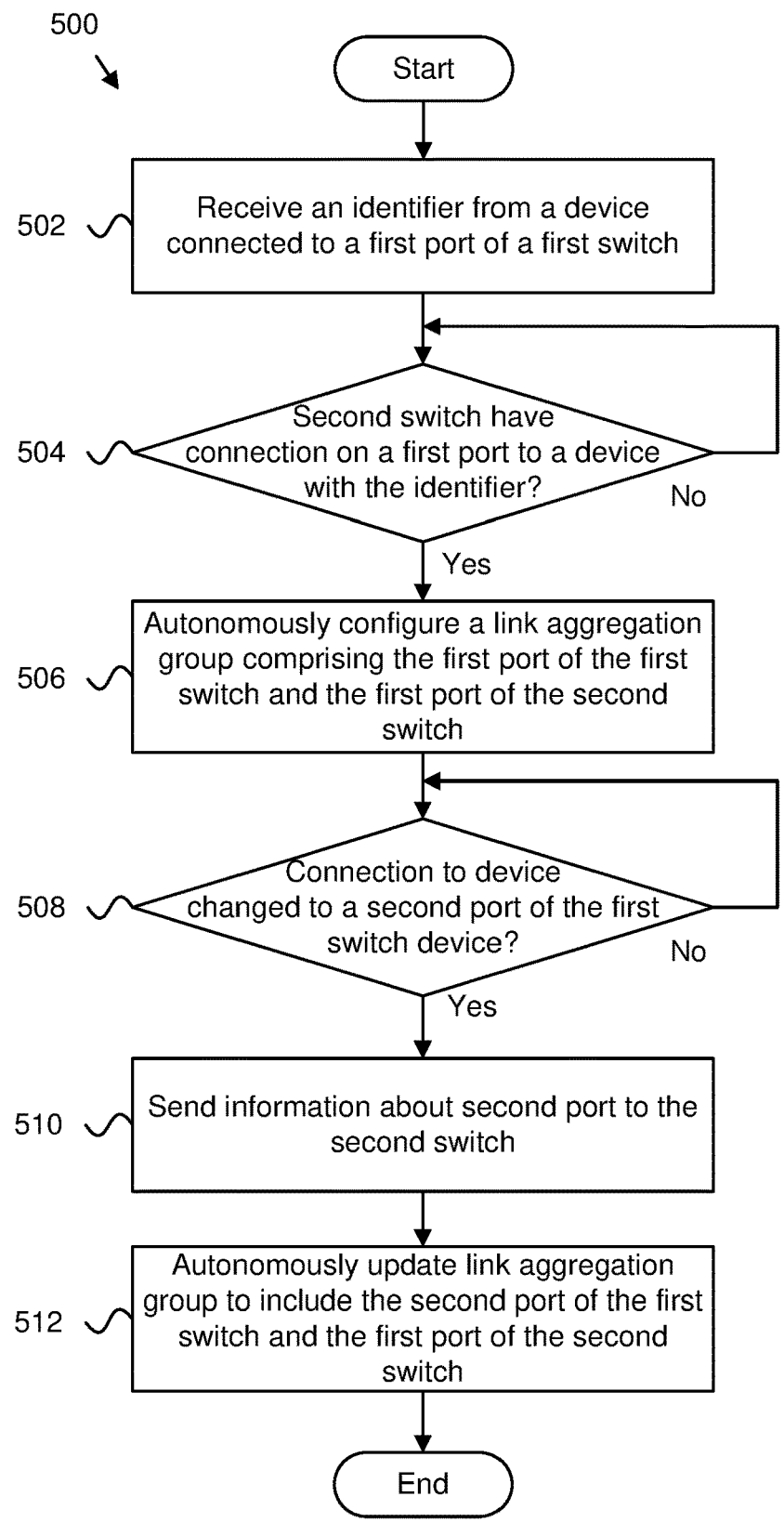
FIG. 5 is a schematic flow chart diagram illustrating one embodiment of a method for link aggregation group management.

FIG. 5 depicts one embodiment of a method 500 for link aggregation group management. In one embodiment, the method 500 begins and receives 502 an identifier from a device that is connected to a first port 206a of a first switch 204a. In a further embodiment, the method 500 determines 504 whether a second switch 204b has a connection to the device on a first port 206b of the second switch 204b based on the identifier that was received 502 at the first switch 204a. If not, the method 500 continues to determine whether the second switch 204b has a connection to the device based on the device identifier. Otherwise, the method 500 dynamically and autonomously configures 506 a link aggregation group that includes the first port 206a of the first switch 204a and the second port 206b of the second switch 204b.

In various embodiments, the method 500 determines 508 whether a connection to a device at the first switch 204a has changed from the first port 206a to a second port 206a of the first switch 204a. If not, the method 500 continues to determine 508 whether a connection to the device is changed from the first port 206a to a second port 206a. Otherwise, the method 500 sends 510 information about the second port 206a to the second switch 204b, and updates 512, dynamically and autonomously, the link aggregation group such that the link aggregation group includes the second port 206a of the first switch 204a and the first port 206b of the second switch 204b, and the method 500 ends. In certain embodiments, the device module 302, the connection module 304, and the group module 306 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a device module that receives, at a first switch, an identifier from a host device connected to a first port of the first switch, the identifier uniquely identifying the host device on a network;
    a connection module that determines whether a second switch has a connection to the host device on a first port of the second switch based on the identifier for the host device;
    a group module that autonomously configures a link aggregation group comprising the first port of the first switch and the first port of the second switch in response to determining that the host device is connected to the first port of the first switch and the first port of the second switch; and
    an error module that:
        detects that the connection to the host device is down on the first port of the first switch;
        provides a notification that the connection to the host device is down on the first port of the first switch; and autonomously removes the first port of the first switch from the link aggregation group, wherein:
the device module detects that the connection to the host device is changed to a second port of the first switch;
the connection module sends a port identifier for the second port to the second switch in response to detecting that the connection to the host device is changed to the second port of the first switch; and
the group module autonomously updates the link aggregation group, based on the identifier for the host device, such that the link aggregation group comprises the second port of the first switch and the first port of the second switch, and
wherein said modules comprise one or more of hardware circuits, programmable hardware devices, and a processor executing code.

2. The apparatus of claim 1, wherein:
the connection module checks the second switch at periodic intervals to determine whether the host device is connected to a second port of the second switch instead of the first port of the second switch; and
the group module autonomously updates the link aggregation group such that the link aggregation group comprises the first port of the first switch and the second port of the second switch in response to determining that the host device is connected to the second port of the second switch.

3. The apparatus of claim 1, wherein the group module maintains a mapping of ports of the first switch to link aggregation groups comprising the ports of the first switch and corresponding ports of the second switch.

4. The apparatus of claim 1, wherein the group module autonomously configures the link aggregation group free of input from a user.

5. The apparatus of claim 1, wherein the device module, the connection module, and the group module are located on one or more of the first switch and the second switch.

6. The apparatus of claim 1, wherein the first switch and the second switch are communicatively coupled to each other via an inter-switch link, the inter-switch link comprising a plurality of network connections.

7. The apparatus of claim 1, wherein the identifier for the host device connected to the first switch and the second switch is a hostname for the host device.

8. The apparatus of claim 1, wherein one or more of:
the first switch and the second switch have link layer discovery protocol ("LLDP") enabled; and
the host device connected to the first switch and the second switch has link layer discovery protocol ("LLDP") enabled.

9. The apparatus of claim 1, wherein the link aggregation group comprises one of a virtual link aggregation group, a multichassis link aggregation group, an etherchannel, and a virtual port channel.

10. A method comprising:
receiving, at a first switch, an identifier from a host device connected to a first port of the first switch, the identifier uniquely identifying the host device on a network;
determining whether a second switch has a connection to the host device on a first port of the second switch based on the identifier for the host device;
autonomously configuring a link aggregation group comprising the first port of the first switch and the first port of the second switch in response to determining that the host device is connected to the first port of the first switch and the first port of the second switch;
detecting that the connection to the host device is down on the first port of the first switch;
providing a notification that the connection to the host device is down on the first port of the first switch;
autonomously removing the first port of the first switch from the link aggregation group;
detecting that the connection to the host device is changed to a second port of the first switch;
sending a port identifier for the second port to the second switch in response to detecting that the connection to the host device is changed to the second port of the first switch; and
autonomously updating the link aggregation group such that the link aggregation group comprises the second port of the first switch and the first port of the second switch.

11. The method of claim 10, further comprising:
checking the second switch at periodic intervals to determine whether the host device is connected to a second port of the second switch instead of the first port of the second switch; and
autonomously updating the link aggregation group such that the link aggregation group comprises the first port of the first switch and the second port of the second switch in response to determining that the host device is connected to the second port of the second switch.

12. The method of claim 10, further comprising maintaining a mapping of ports of the first switch to link aggregation groups comprising the ports of the first switch and corresponding ports of the second switch.

13. The method of claim 10, further comprising autonomously configuring the link aggregation group free of input from a user.

14. The method of claim 10, wherein the receiving, the determining, and the autonomously configuring are performed at one or more of the first switch and the second switch.

15. The method of claim 10, wherein the identifier for the host device connected to the first switch and the second switch is a hostname for the host device.

16. A program product comprising a non-transitory computer readable storage medium that stores code executable by a processor, the executable code comprising code to perform:
receiving, at a first switch, an identifier from a host device connected to a first port of the first switch, the identifier uniquely identifying the host device on a network;
determining whether a second switch has a connection to the host device on a first port of the second switch based on the identifier for the host device;
autonomously configuring a link aggregation group comprising the first port of the first switch and the first port of the second switch in response to determining that the host device is connected to the first port of the first switch and the first port of the second switch;
detecting that the connection to the host device is down on the first port of the first switch;
providing a notification that the connection to the host device is down on the first port of the first switch;
autonomously removing the first port of the first switch from the link aggregation group;
detecting that the connection to the host device is changed to a second port of the first switch;

sending a port identifier for the second port to the second switch in response to detecting that the connection to the host device is changed to the second port of the first switch; and autonomously updating the link aggregation group such that the link aggregation group comprises the second port of the first switch and the first port of the second switch.

\* \* \* \* \*